Patented Feb. 15, 1949

2,461,662

UNITED STATES PATENT OFFICE 2,461,662

PREPARATION OF ALKALI METAL COMPOUNDS

Hermann I. Schlesinger, Chicago, Ill., and Herbert C. Brown, Detroit, Mich., assignors to the United States of America as represented by the United States Atomic Energy Commission No Drawing. Application January 9, 1945, Serial No. 572,091

9 Claims. (Cl. 23—204)

1

The invention relates to the preparation of borohydrides of the alkali metals.

It is an object of the invention to provide an efficient and convenient process for the preparation of alkali metal borohydrides. A more specific object of the invention is a provision of a process in which an alkali metal alkoxide is reacted with a boron hydride to form an alkali metal borohydride. Further objects and advantages will be apparent from the following description.

In accordance with the present invention it has been found that an alkali metal borohydride may be obtained from the reaction of an alkali metal alkoxide and diborane $B_2H_6$. It has also been found that the reaction yielding the alkali metal borohydride is particularly effective where the alkali metal alkoxide is formed of a lighter alkali metal such as lithium or sodium and contains a lower alkyl group such as methyl, ethyl, propyl, or the like. The reaction between the alkali metal alkoxide and the diborane probably proceeds according to the following equation:

$$3MeOR + 2B_2H_6 \rightarrow 3MeBH_4 + B(OR)_3$$

in which Me indicates an alkali metal and R indicates a monovalent organic radical derived from a monohydric alcohol (ROH) such as, methyl, ethyl, n-propyl, isopropyl, n-butyl, isobutyl, lauryl, allyl, propargyl, or similar alcohol.

In preparing the alkali metal borohydride, the alkali metal alkoxide is placed in a reaction vessel with diborane then being introduced into the reaction vessel and into contact with the alkali metal alkoxide under suitable conditions of time and temperature. A reaction occurs between the diborane and the alkali metal alkoxide with the desired alkali metal borohydride being formed as a reaction product. The reaction proceeds at room temperature and below. However elevated temperatures, for example up to about 85° C. may be used if desired. If desired, a quantity of diborane sufficient to convert all of the alkali metal alkoxide to the corresponding alkali metal borohydride may be introduced into the reaction vessel and into contact with the alkali metal alkoxide, the diborane then remaining in contact with the alkali metal alkoxide until the reaction is complete. Alternatively diborane may pass over or through a porous mass of the alkoxide.

The diborane may be prepared by the reaction of an alkali metal hydride and a boron halide in the presence of an ether such as, for example, diethyl ether. A suitable example of this method

2 is described in our copending application Serial No. 576,502, filed Feb. 6, 1945.

The reaction is carried out in a closed system comprising a reactor provided with an agitator and adequate distillation and evacuation equipment. After the introduction of the alkali metal alkoxide, air is substantially completely removed from the reactor by flushing with nitrogen or other inert gas or by evacuation of the reactor. This is essential to avoid mixing of air with diborane.

Thereafter diborane is introduced in gaseous or liquid state and the reaction permitted to proceed. Usually this reaction takes place at or about room temperature although some heating may be required if the reaction does not proceed as rapidly as desired. After the reaction is completed the alkali metal borohydride may be skimmed to remove various volatile products formed during the reaction, leaving the alkali metal borohydride remaining behind as a solid residue. Yields of the alkali metal borohydride of from 80 per cent and 90 per cent of the theoretical yield may be obtained in this manner of preparation.

The following specific examples illustrate the preparation of sodium borohydride and lithium borohydride:

Example I.—For the preparation of sodium borohydride, sodium methoxide, $NaOCH_3$, in the amount of 0.19 gram was placed in a reactor comprising a heat-resistant glass tube. Diborane in the amount of 65.5 cubic centimeters, referred to standard conditions, was solidified by means of liquid nitrogen in the lower portion of a gas bulb, the gas bulb then being connected to the reactor. After substantially completely exhausting the air from the reactor, the exhaust outlet was closed and the connection to the filled gas bulb was opened thereby providing access of the diborane to the reactor. The condensed diborane in the gas bulb was vaporized by permitting the temperature of the gas bulb to rise to room temperature. In conjunction with raising the temperature of the gas bulb, the temperature of the reactor was lowered to approximately —196° C. by liquid nitrogen. As the temperature of the reactor was lowered, the diborane contained in the gas bulb passed into the reactor. The temperature of the reactor was then permitted to rise to room temperature. The reaction between the diborane and the sodium methoxide began at a temperature of approximately —80° C. and continued until the temperature of the reactor was approximately 25° C. During the reaction considerable heat was developed in the reactor. After the reaction was complete, various volatile products formed during the reaction were pumped off in vacuum with the sodium borohydride remaining behind as a white solid residue. After removal of the borate ester by distillation a yield of sodium borohydride of approximately 83 percent of the theoretical yield was obtained.

*Example II.*—In the preparation of lithium borohydride, lithium methoxide, $LiOCH_3$, in the amount of 0.2214 gram, was placed in a reactor comprising a heat-resistant glass tube. Diborane, in the amount of approximately 152 cubic centimeters, referred to standard conditions, was solidified in the lower portion of the gas bulb by means of liquid nitrogen, the gas bulb then being connected to the reactor. After substantially completely exhausting the air from the reactor, the exhaust outlet was closed and the connection to the filled gas bulb was opened thereby providing access of the diborane to the reactor. The condensed diborane in the gas bulb was vaporized by permitting the temperature of the gas bulb to rise to room temperature. In conjunction with raising the temperature of the gas bulb, the temperature of the reactor was lowered to approximately $-196°$ C. by liquid nitrogen. As the temperature of the reactor was lowered, the diborane contained in the gas bulb passed into the reactor. The temperature of the reactor was then permitted to rise to room temperature. The reaction between the diborane and the lithium methoxide began at a temperature of approximately $-80°$ C. and continued until the temperature of the reactor was approximately 25° C., considerable heat being developed during the reaction. The volatile products produced during the reaction were pumped off in vacuum leaving lithium borohydride as a solid residue. This process may also be conducted with somewhat higher yields using lithium ethoxide in lieu of lithium methoxide.

The above detailed description is for purposes of illustration and specific details disclosed are not intended to limit the scope of the invention except is so far as included in the following claims.

We claim:
1. A process of preparing an alkali metal borohydride which comprises reacting diborane and an alkali metal alkoxide.
2. A process of preparing an alkali metal borohydride which comprises reacting diborane and an alkali metal methoxide.
3. A process of preparing sodium borohydride which comprises reacting diborane and sodium alkoxide.
4. A process of preparing sodium borohydride which comprises reacting diborane and sodium methoxide.
5. A process of preparing an alkali metal borohydride which comprises reacting diborane and an alkali metal alkoxide at a temperature below room temperature.
6. A process of preparing an alkali metal borohydride which comprises passing diborane over an alkali metal alkoxide at a temperature of between $-50°$ C. and $50°$ C.
7. A process of preparing an alkali metal borohydride which comprises reacting diborane and alkali metal alkoxide in a closed system while maintaining the system substantially free from air.
8. A process of preparing an alkali metal borohydride which comprises introducing an alkali metal alkoxide into a reactor substantially completely removing a substantial amount of air from the reactor, and introducing diborane into the reactor and into contact with the alkali metal alkoxide, the temperature of the alkali metal alkoxide and diborane in the reactor being maintained between $-80°$ C. and $50°$ C.
9. A process of preparing an alkali metal borohydride which comprises introducing an alkali metal alkoxide into a reactor substantially completely removing the air from the reactor and passing diborane into the reactor and into contact with the alkali metal alkoxide.

HERMANN I. SCHLESINGER.
HERBERT C. BROWN.

No references cited.